United States Patent
Abke et al.

(10) Patent No.: US 11,999,005 B2
(45) Date of Patent: Jun. 4, 2024

(54) DEVICE AND METHODS OF MULTIPLE SPOT WELDING FOR AUTOMOTIVE APPLICATIONS USING VAPORIZING FOIL ACTUATOR WELDING

(71) Applicants: HONDA MOTOR CO., LTD., Tokyo (JP); OHIO STATE INNOVATION FOUNDATION, Columbus, OH (US)

(72) Inventors: Timothy A. Abke, Hilliard, OH (US); Glenn Steven Daehn, Columbus, OH (US); Anupam Vivek, Columbus, OH (US); Ryan Carl Brune, Bexley, OH (US); Ali Nassiri, Lewis Center, OH (US)

(73) Assignees: HONDA MOTOR CO., LTD, Tokyo (JP); OHIO STATE INNOVATION FOUNDATION, Tokyo (JP)

( * ) Notice: Subject to any disclaimer, the term of this patent is extended or adjusted under 35 U.S.C. 154(b) by 576 days.

(21) Appl. No.: 17/174,058

(22) Filed: Feb. 11, 2021

(65) Prior Publication Data
US 2022/0250187 A1 Aug. 11, 2022

(51) Int. Cl.
*B23K 20/16* (2006.01)
*B23K 3/08* (2006.01)
(Continued)

(52) U.S. Cl.
CPC .......... *B23K 20/165* (2013.01); *B23K 20/00* (2013.01); *B23K 3/087* (2013.01); *B23K 11/115* (2013.01);
(Continued)

(58) Field of Classification Search
CPC ...... B21D 26/06; B23K 20/165; B23K 11/26; B23K 11/115
See application file for complete search history.

(56) References Cited

U.S. PATENT DOCUMENTS 3,535,767 A 10/1970 Doherty, Jr. et al.
4,231,506 A 11/1980 Istvanffy et al.
(Continued)

FOREIGN PATENT DOCUMENTS

CN 208680798 U * 4/2019 ............ B23K 31/02

OTHER PUBLICATIONS

CN-208680798-U (Deng Jianghua,) Apr. 2, 2019 [retrieved on Mar. 13, 2024]. Retrieved from Espacenet Database, translation by EPO and Google. (Year: 2019).*

(Continued)

*Primary Examiner* — John J Norton
*Assistant Examiner* — Franklin Jefferson Wang
(74) *Attorney, Agent, or Firm* — ArentFox Schiff LLP; Morgan Lincoln

(57) ABSTRACT

A multiple spot vaporizing foil actuator weld (VFAW) system includes a target sheet layer secured relative to a stabilizing component, such that standoff components may be arranged sandwichably between the target and a flier sheet layer. An electrically insulating layer separates the flier from a vaporizing component sheet layer, which may comprise at least two vaporizing subsections configured to have less conductive material than at least three dividing subsections that separate the vaporizing subsections. The geometry and/or other features of the vaporizing subsections may be varied to optimize the vaporization. A second electrically insulated stabilizing component may sandwichably secure the above components between the first stabilizing component in order to control the forces generated in the VFAW process. The method involves loading the vaporizable component sheet layer with electrons via applied voltage such that the vaporizing subsections sublimate. The rapidly expanding gas particles accelerate the flier, completing the weld.

20 Claims, 15 Drawing Sheets

(51) Int. Cl.
  *B23K 11/11*  (2006.01)
  *B23K 11/26*  (2006.01)
  *B23K 20/00*  (2006.01)
  *B23K 101/00* (2006.01)
  *B23K 101/18* (2006.01)

(52) U.S. Cl.
  CPC ......... *B23K 11/26* (2013.01); *B23K 2101/006* (2018.08); *B23K 2101/18* (2018.08)

(56) References Cited

U.S. PATENT DOCUMENTS

| | | | |
|---|---|---|---|
| 4,248,373 | A | 2/1981 | Linse et al. |
| 9,021,845 | B2 | 5/2015 | Vivek et al. |
| 2016/0008883 | A1 | 1/2016 | Vivek et al. |
| 2018/0036828 | A1* | 2/2018 | Detwiler ................. B23K 11/11 |
| 2019/0015925 | A1* | 1/2019 | Vivek ................... B23K 20/22 |

OTHER PUBLICATIONS

Tim Heston, Vaporizing foil actuator welding: Joining by impact, How a new process welds the previously unweldable, FMA Communications Inc., The Fabricator, vol. 48, No. 2, Feb. 2018, (2 Pages Total).

John Kosowatz, "New Welding Process Joins High-Strength Metals", The American Society of Mechanical Engineers, May 26, 2016, (6 Pages Total) https://www.asme.org/engineering-topics/articles/manufacturing-design/new-welding-process-joins-high-strength-metals.

* cited by examiner

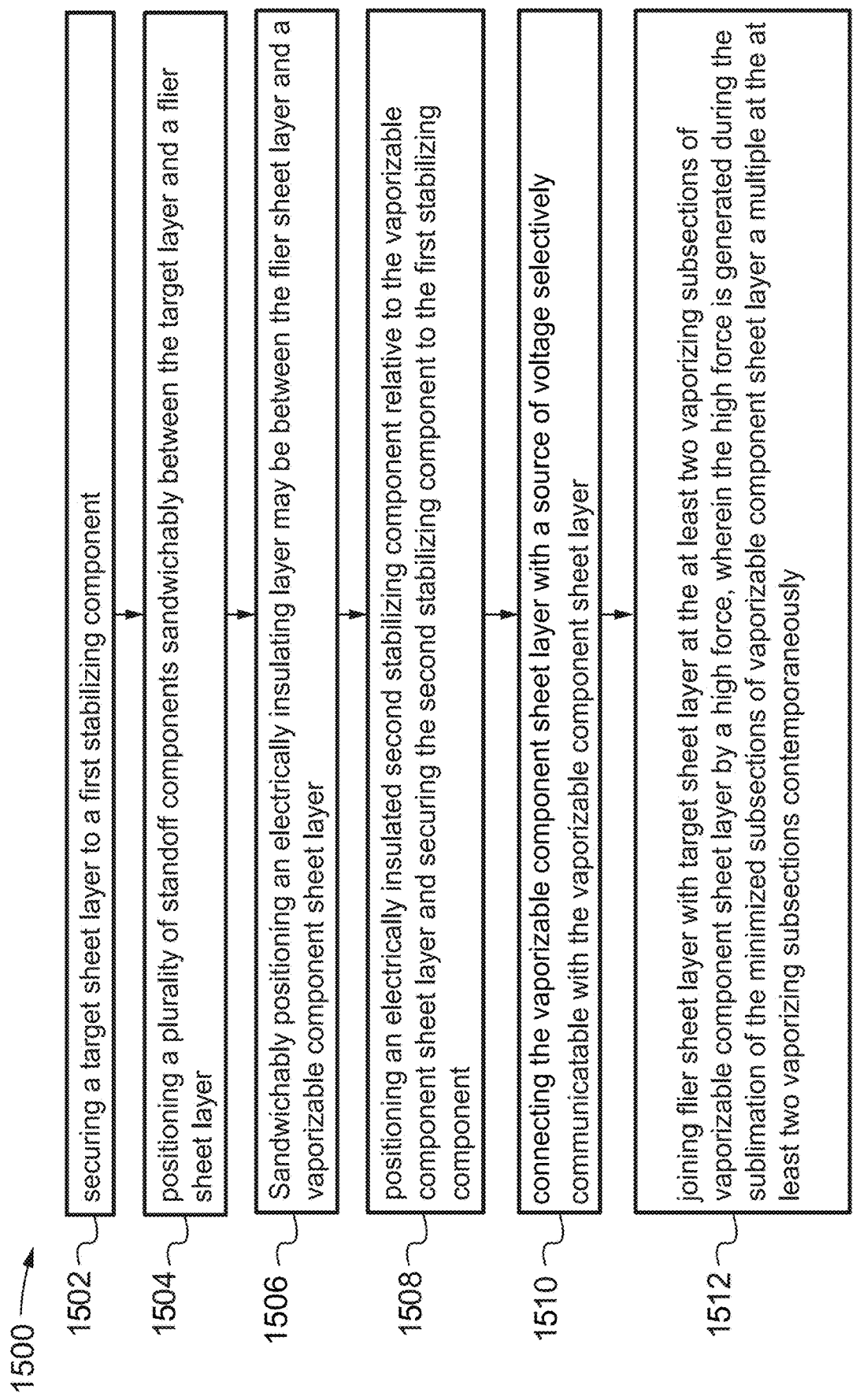

DEVICE AND METHODS OF MULTIPLE SPOT WELDING FOR AUTOMOTIVE APPLICATIONS USING VAPORIZING FOIL ACTUATOR WELDING

BACKGROUND OF THE TECHNOLOGY

Field

Aspects of the present disclosure relate to a device for completing multiple spot welds using a vaporizing foil actuator welding process, methods of multiple spot vaporizing foil actuator welding for automotive applications, and methods of use thereof.

Background

Collision welding was first discovered when World War 1 engineers observed that armored tanks returning from war were not merely impaled with shrapnel propelled by battlefield explosives, but in addition the metal of the impaling shrapnel had sometimes fused with the metal of the tank to form one object in the metal. Upon further research, it was discovered that the metals had in such cases joined due to the high velocity of the shrapnel upon impact. Consequently, collision welding was developed as a reliable welding method with a unique ability to join dissimilar metal materials by means of a high-speed, oblique collision. Within this collision, the welding occurs consequent of the removal of the surface oxide layers from both component metals, such that the fresh layers of each respective material may be brought into contact so as to produce a metallurgical bond. Replicating the original conditions in which this collision metal fusion had first been observed, collision welding in an industry setting involves propelling a "flier" sheet of metal material into a stationary "target" metal material, such that the resulting collision joins the target metal and flier metal. However, in the laboratory for related art use, the flier sheet of metal material is accelerated to speeds greater than the speed of sound not in the context of the theater of war, but instead by implementing carefully controlled, chemically compelled explosions.

Collision welding, as well as other similar high-velocity impact welding techniques, provide a distinct advantage over traditional welding methods consequent of the low temperatures required by the process. However, because explosives are required to complete a weld, in the related art collision welding has traditionally been constrained to larger scales. Additionally, consequent of the process intensive materials needed to safely control such explosions, collision welding has not typically been applicable in a variety of smaller scale industry settings in the related art, such as for use in the automotive industry.

Within the automotive industry, the welding method used typically involves fusing metal surfaces via the heat generated from resistance to an electric current, known as resistance spot welding (RSW). However, the RSW process is also limited in certain applications. Specifically, when producing multiple contemporaneous welds, the RSW process requires an increasingly higher current load for each additional weld produced. Consequently, the cost of completing multiple contemporaneous welds is additive, and thus prohibitively expensive.

However, there has been a recent related art development of an alternative collision welding method implementable in a variety of commercial, industry, or laboratory settings. Applicable on small scales without machinery intensive equipment and explosives, vaporizing foil actuator welding (VFAW) provides a practical alternative for welding dissimilar materials, conserving the traditional advantage of other collision welding methods. Instead of using chemically driven explosives to generate the force necessary to propel the flier metal material and complete the collision weld, the VFAW method utilizes an electrical impulse to vaporize a thin metallic conductor component, such that the transformation of the solid metallic conductor directly into its gaseous state results in the formation of a rapidly expanding and energetic vapor capable of generating the high forces required to propel a flier sheet into a target metal material at the speeds necessary to complete a collision weld. In particular, the VFAW process of the related art may accelerate the flier sheet to speeds greater than the speed of sound in order to complete a collision weld comparable to an chemically driven collision weld. Specifically, in the VFAW technique of the related art, electrical energy stored in a nearby capacitor bank is released to the thin metal conductor, such as an aluminum including foil, for example. When the energy deposition rate into the metal conductor component is very high, the thin metal conductor may be heated to above its energy of sublimation before it has time to melt. Consequently, the thin metal conductor vaporizes directly from its solid state into a rapidly expanding gas that may form a high pressure pulse that may be harnessed to apply force to a flyer component to the extent necessary to create the desired collision weld without the use of explosives.

As a result, the VFAW method serves as an agile approach for carrying out collision welding on a laboratory scale with fairly light machinery and tooling. However, even within such an application of VFAW welding, with the machinery and devices currently available within the related art, it is only possible to complete one VFAW weld without reconfiguring and restarting the VFAW welding process. Consequently, it may be difficult to form multiple welds in a given constrained period of time. Thus, despite the advent of the single spot VFAW method, there exists an unmet need to further develop the machinery, devices and methods of the VFAW process such that the process maintains the many advantages of collision welding methods, while also allowing for a cost effective upward scaling of the welding process in an industry or other similar manufacturing setting, including such that the welding method is capable of completing multiple contemporaneous welds without becoming prohibitively expensive.

SUMMARY

Consequent of the problems and deficiencies as described above, as well as others, there remains an unmet need for a collision welding method capable of cost effectively completing multiple welds contemporaneously, applicable in a variety of replicable industry setting and laboratory settings.

An example multiple spot vaporization weld system in accordance with aspects of the present disclosure includes a target sheet layer secured relative to a first stabilizing component, and a plurality of standoff components arranged sandwichably between the target sheet layer and a flier sheet layer. An electrically insulating layer may be emplaced so as to separate the flier sheet layer from a vaporizing component sheet layer located adjacent thereto, the vaporizing sheet layer comprising at least two vaporizing subsections configured to have less conductive material than at least three dividing subsections that separate the vaporizing subsections. The geometry of the vaporizing subsections may be varied so as to optimize or otherwise manipulate efficiency or timing of the vaporization of the vaporizable component sheet layer when a current is applied thereto, thus controlling the location and timing of the plurality of produced welds, depending, at least in part, on the electrical characteristics of the system, and the confinement of the foil/sample, among other factors. Further a second stabilizing component electrically insulated relative to the vaporizable component sheet layer may be secured relative to the vaporizable component sheet layer and may be interoperable with the first stabilizing component to counteract force generated during the production of the plurality of welds.

The VFAW process in accordance with aspects of the present disclosure involves loading the vaporizable component sheet layer with excess electrons via a source of voltage selectively connectable with the vaporizable component sheet layer such that vaporizing subsections of the vaporizable component sheet layer are heated to their sublimation point, wherein the rapidly expanding gas particles are controlled so as to accelerate a portion of the flier sheet layer within the standoff distance created by the plurality of standoff components and propel the portions of flier sheet layer into the target sheet layer at speeds greater than the speed of sound, e.g., in the air, to complete the weld.

The above presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

BRIEF DESCRIPTION OF THE FIGURES

FIG. 15 illustrates an example method for completing a plurality of welds utilizing a vaporizing foil actuator welding system, in accordance with aspects of the present disclosure.

DETAILED DESCRIPTION

Figure 1:
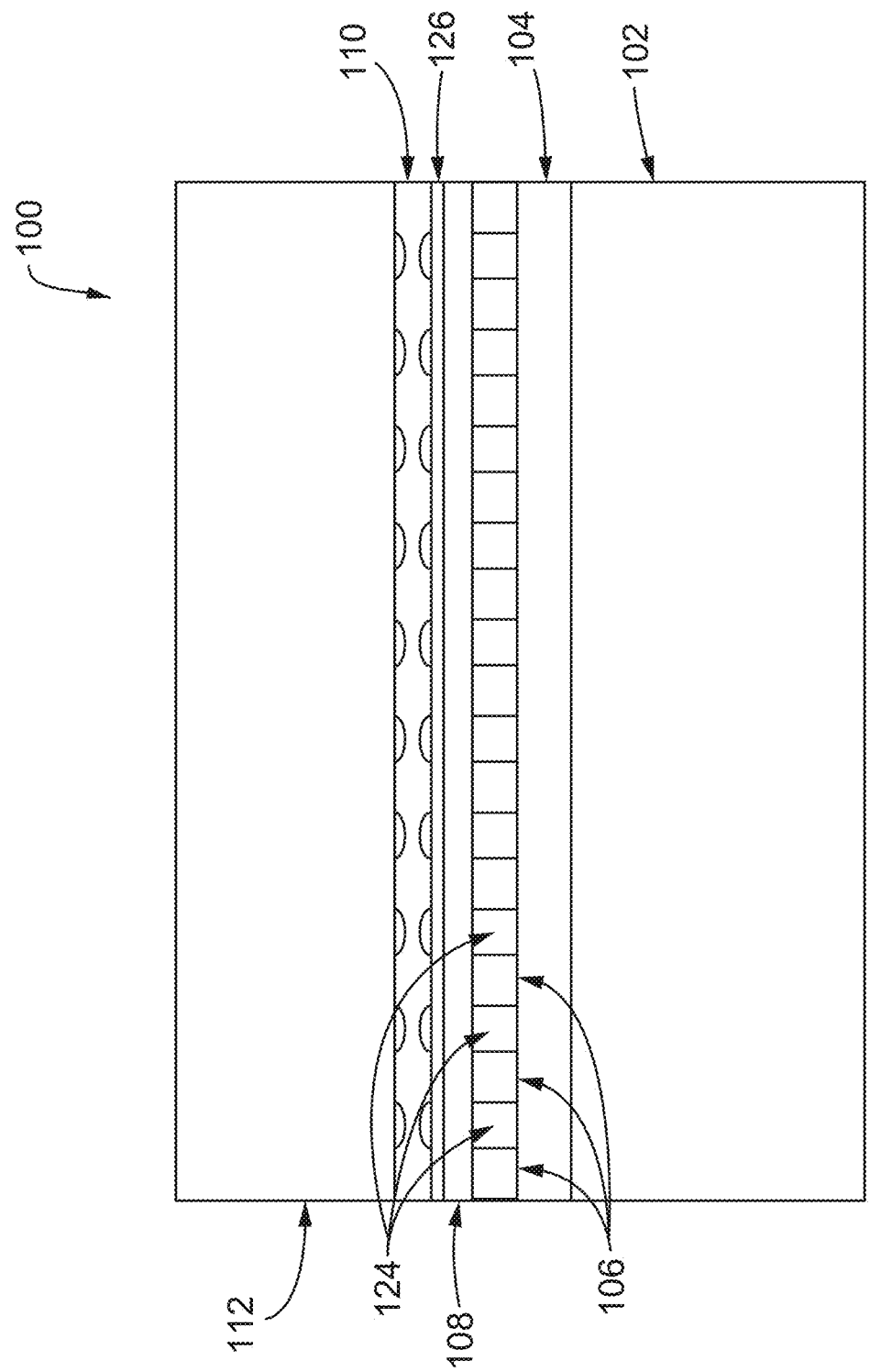
FIG. 1 illustrates a side cross-sectional representative view of various features of a vaporizing foil actuator welding device, in accordance with aspects of the present disclosure.

FIG. 1, according to various aspects of the present disclosure, representatively illustrates a side cross-sectional view of various features of a VFAW welding setup 100. As illustrated, VFAW welding setup 100 may include a first stabilizing component 102, wherein first stabilizing component 102 may comprise an anvil, block of steel, or similarly massive object capable of containing and aiding control the direction of the force generated in the VFAW process. Further, FIG. 1 illustrates a target sheet layer 104 secured relative to first stabilizing component 102. Target sheet layer 104 may include comprise steel, brass, nickel, silver, titanium, zirconium, stainless steel or a variety of other types of metals, metal alloys, or otherwise metallic materials. A plurality of standoff components 106 may be sandwichably positioned between target layer 104 and a flier sheet layer 108 forming a standoff spacing distance between the target layer 104 and the flier sheet layer 108. It will be understood by those of skill in the art the that the components in FIG. 1 are not necessarily drawn to scale. Standoff spacing distance 124 may provide, for example, a sufficient spacing distance required for portions of flier sheet layer 108 to accelerate to the speeds necessary to complete the impact weld during the VFAW welding process. Flier sheet layer 108 may also comprise steel, brass, nickel, silver, titanium, zirconium, stainless steel, or a variety of other types of metals, metal alloys, or otherwise metallic materials. Target sheet layer 104 may comprise the same material as flier sheet layer 108. However, target sheet layer 104 and flier sheet layer 108 may also comprise dissimilar metals. Among other advantages, in the multiple VFAW process, when two dissimilar metals are used, the two dissimilar materials may bond while also retaining the mechanical, electrical, and corrosion properties of both individual component metals. The multiple spot VFAW process may be particularly useful for joining dissimilar metals not easily welded via other methods.

As further illustrated in FIG. 1, according to various aspects of the present disclosure, the VFAW welding set up may also include a first electrically insulating layer 126, wherein first electrically insulating layer 126 may comprise glass, porcelain, composite polymers, fiber reinforced plastic, silicone rubber, and other similarly electrically insulating materials. First electrically insulating layer 126 may aid in the proper and efficient loading of electrons of a vaporizable component sheet layer 110, while also protecting the flier sheet layer 108 from corrosion or other similar effects. Vaporizable component sheet layer 110, which may be positioned proximal to electrically insulating layer 126 may comprise a conductive material, such as aluminum. Additionally, according to various aspects, FIG. 1 illustrates a second stabilizing component 112 located proximal to vaporizable component sheet layer 110. Second stabilizing component 112 may be electrically insulated relative to vaporizable component sheet layer 110. Second stabilizing component 112 may comprise an anvil, steel block, or otherwise similarly massive object that aids in controlling the forces produced in the VFAW process. Further, second stabilizing component 112 may optimize the ability of the vaporization process to accelerate flier sheet layer 108 into target sheet layer 106 to complete the multiple welds. In one example, in order to provide electrical insulation, second stabilizing component 112 may comprise a non-conductive or similarly electrically insulated material. In another example, second stabilizing component 112 may further include a non-conductive, electrically insulating coating layer upon the surface of second stabilizing component 112. In yet another variation of the system, the VFAW welding set up may further comprise a second electrically insulating layer sandwichably located between vaporizable component sheet layer 110 and second stabilizing component 112. The inclusion of electrically insulating layer 126 in combination with either a second electrically insulating layer or a non-conductive electrically insulated second stabilizing component 112 may increase the efficiency of the electron loading of the vaporizable component sheet layer 110 during the VFAW process, while also protecting the surrounding materials such as flier sheet layer 108 and second stabilizing component 112 from corrosion or other similar impacts.

Further, in accordance with various aspects of the present disclosure, second stabilizing component 112 may also be selectively securable relative to first stabilizing component layer 102, such that forces produced by the vaporization of vaporizable component sheet layer 110 may be contained by the cooperation of both first stabilizing component 102 and second stabilizing component 112. However, in another example illustrated in FIG. 1, the downward force generated by the mass of second stabilizing component 112 may alone be sufficient to counteract and contain forces produced consequent of the VFAW process without additional securing of second stabilizing component 112 to first stabilizing component 102. Furthermore, additional methods of securing first stabilizing component 102 relative to second stabilizing component 112 or otherwise containing the high forces generated in the VFAW process may be implemented in VFAW welding setup 100.

Figure 2:
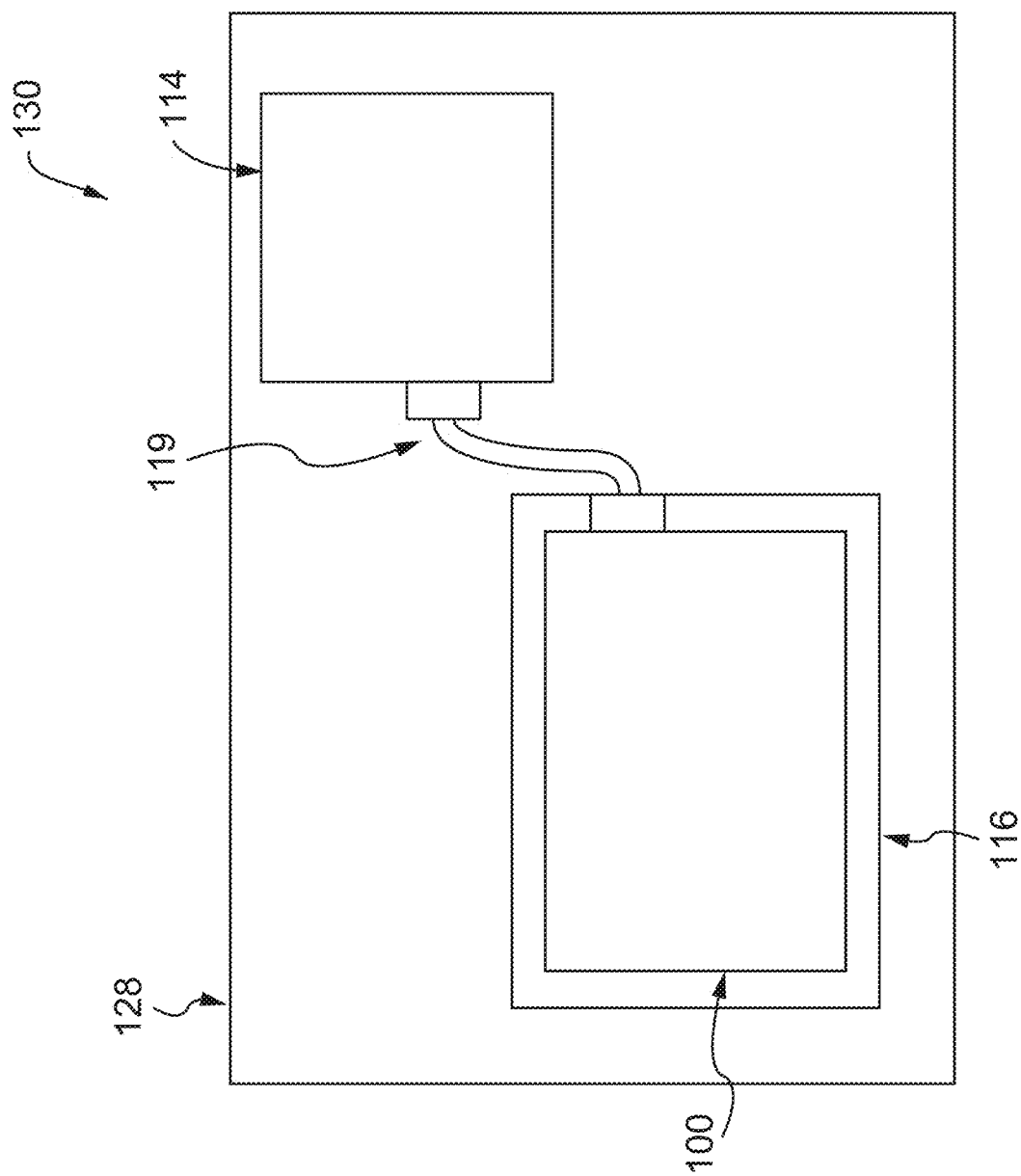
FIG. 2 illustrates a top view of an example vaporizing foil actuator welding system, in accordance with aspects of the present disclosure.

FIG. 2 illustrates an overhead view of various features of an example multiple spot VFAW welding system 130, in accordance with aspects of the present disclosure. The system 130 shown in FIG. 2 includes a VFAW welding setup 100, a sound attenuating member 116, wherein sound attenuating member 116 may, for example, fully or partially encapsulate VFAW welding setup 100, a voltage source 114 selectively connectable to VFAW welding set up 100, and a VFAW system housing 128. Sound attenuating member 116 may comprise glass, plastic, or other similar material, such that the sound generated via the vaporization of the vaporizable component sheet layer 110 during the VFAW process may be dampened. Though a sound attenuating member 114 may be incorporated within the multiple VFAW welding system 130 in order to improve the safety and long term hearing health of any person within close proximity to VFAW welding setup 100 during vaporization, for example, sound attenuating member 114 may not be necessary to complete the VFAW welding process in order to produce a plurality of welds.

Voltage source 114 may comprise a capacitor bank or a similar mechanism capable of generating voltage to be supplied to VFAW welding setup 100. Voltage source 114 may be selectively connectable to VFAW welding setup 100 via voltage connector 119, such as a cable, wire and/or other circuit features. VFAW welding setup 100 may be selectively connectable to voltage source 114 via voltage connector 119. Further, VFAW welding setup 100, voltage source 114, and voltage connector 119 may be encapsulated by a VFAW system housing 128. VFAW system housing 128 may comprise an additional barrier layer that surrounds VFAW welding set up 100, further providing protection with respect to operation of the VFAW welding setup 100. Thus, the additional barrier layer of VFAW system housing 128 may include the walls of a distinct room in which the VFAW welding set up 100 is arranged, glass paneling encapsulating VFAW welding set up 100, or any similar barrier mechanism, for example.

Figure 3:
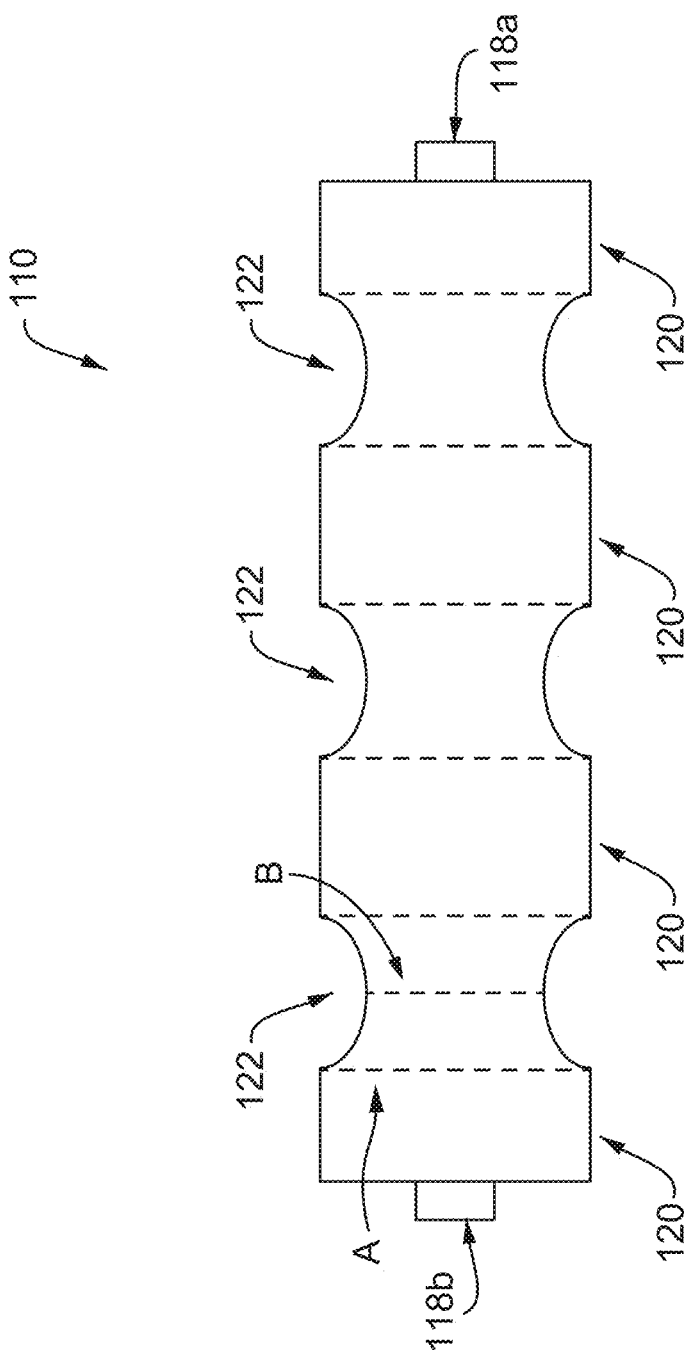
FIG. 3 illustrates a top view of an example vaporizable component sheet layer, in accordance with aspects of the present disclosure.

According to various aspects of the present disclosure, FIG. 3 illustrates a top view of an example vaporizable component sheet layer 110 for use within the multiple spot VFAW welding system, according to aspects of the present disclosure. Vaporizable component sheet layer 110 may comprise at least two vaporizing subsections 122 and at least three dividing subsections 120 configured to separate the vaporizing subsections 122. Vaporizing subsections 122 may be configured to produce a plurality of welds upon vaporization during the VFAW process resultant of the vaporization of vaporizing subsections 122. For example, such vaporization may be enhanced as a result of the vaporizing subsections 122 containing less conductive material (e.g., having less volume or cross-sectional area) than each of the at least three dividing subsections 120. In one example, vaporizing subsections 122 may contain less volume of a conductive material than the volume of each of the at least three dividing subsections 122 via a recess or recessed portions of the vaporizable component sheet layer 110, such that the vaporizing subsections 122 are comparatively smaller in cross-sectional area along at least a portion of the length thereof than dividing subsections 120. In another example, the volume of the vaporizable subsections 122 may be reduced via a thinning of the perpendicular cross-sectional area of vaporizable component sheet layer 110 within each of the vaporizing subsections 122. Reducing the quantity of conductive material within the vaporizing subsections 122 may allow such regions of vaporizable component sheet layer 110 to vaporize before regions of vaporizable component sheet layer 110 that contain more conductive material. Varied distribution of the quantity of conductive material may allow for control of the location of the vaporization of the vaporizable component sheet layer 110, and thus also allow for control of the location of the plurality of welds produced in the VFAW process.

As illustrated in FIG. 3, vaporizing subsections 122 may comprise a cross-sectional area B, wherein cross-sectional area B describes the smallest cross-sectional area of one of the plurality of vaporizing subsections 122, such that cross-sectional area B is less than a cross-sectional area A, wherein cross-sectional area A describes the largest cross-sectional area of the plurality of vaporizing subsections 120. The difference between cross-sectional area B and cross-sectional area A results in the vaporizable component sheet layer 110 having vaporizing subsections 122 due to the presence of less volume of conductive material than that in each of the at least three dividing subsections 120. The reduction of the volume of conductive material allows for control of the location of vaporization only within specific locations of the vaporizable component sheet layer 110, and thus control of the location of the plurality of welds. Additionally, vaporizing subsections 122 and dividing subsections 120 may be arranged, for example, sequentially such that vaporizing subsections 122 alternate with the at least three dividing subsections 120, as also illustrated in FIG. 3. Further, in this example, as illustrated, the placement of vaporizing sections 122 and dividing sections 120 may form vaporizable component sheet layer 110 into a repeating cross-sectional "dog bone" shape area.

As further illustrated in FIG. 3, vaporizable component sheet layer 110 may further include a voltage receiver 118a and a circuit completer 118b. Voltage receiver 118a may be selectively connectable to a voltage connecter, such as voltage connecter 119 of FIG. 2, so as to form a first node for receiving voltage from a voltage source, such as voltage source 114 of FIG. 2. Circuit completer 118b may also be selectively connectable to a ground, so that vaporizable component sheet layer 110 may thereby be connected so as to complete the electrical circuit necessary to load sufficient electrons to vaporizable component sheet layer 110 in order to instigate vaporization of vaporizable subsections 122.

Figure 4:
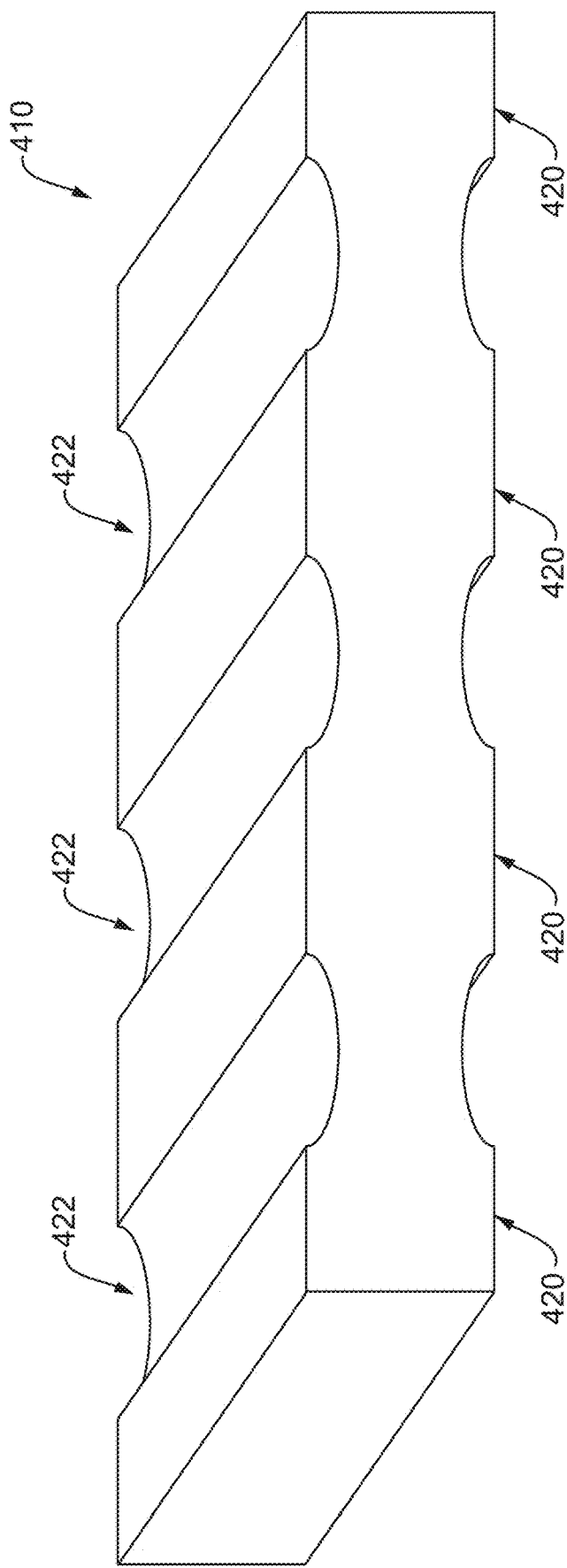
FIG. 4 illustrates a perspective view of an example vaporizable component sheet layer, in accordance with aspects of the present disclosure.

FIG. 4 illustrates a perspective view of another, differently configured, vaporizable component sheet layer 410 for use within the multiple spot VFAW welding system, according to an aspect of the present disclosure. Vaporizable component sheet layer 410 may also include vaporizing subsections 422 including a cross-sectional area B (shown in FIG. 3), wherein cross-sectional area B describes the smallest cross-sectional area of one of the plurality of vaporizing subsections 422. Further, cross-sectional area B may be less than a cross-sectional area A (shown in FIG. 3), wherein cross-sectional area A describes the largest cross-sectional area of the plurality of vaporizing subsections 420. The difference between cross-sectional area B and cross-sectional area A within the vaporizable component sheet layer 110 results in a configuration of vaporizable component sheet layer 410 such that vaporizing subsections 422 have less conductive material that each of the at least three dividing subsections 420. Additionally, similarly to the example illustrated in FIG. 3, vaporizing subsections 422 and dividing subsections 120 may be configured linearly such that vaporizing subsections 422 are each juxtaposed with one of the at least three dividing subsections 420. Further, as illustrated in this example, the placement of vaporizing sections 422 and dividing sections 420 may form cross-sectional shape that emulates a repeating dog bone shaped vaporizable component sheet layer 410.

Figure 5:
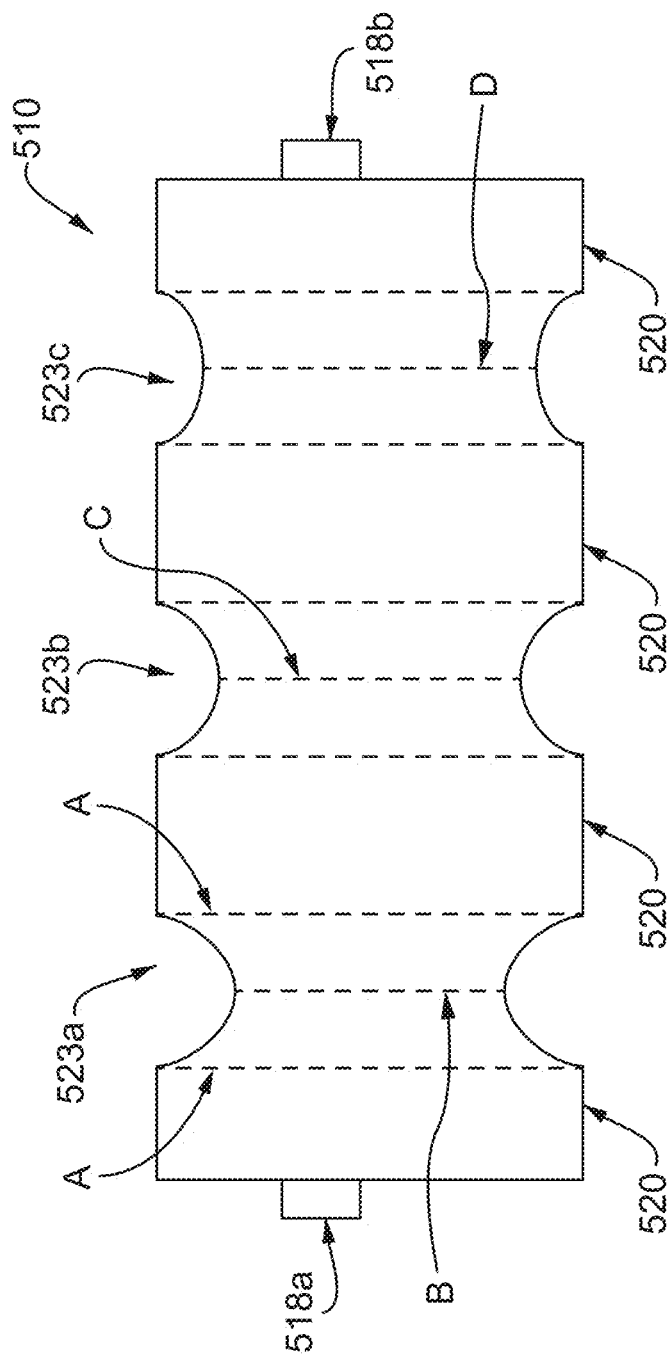
FIG. 5 illustrates a top view of another example vaporizable component sheet layer, in accordance with aspects of the present disclosure.

According to an aspect of the present disclosure, FIG. 5 illustrates an additional configuration of vaporizable component sheet layer 510, wherein vaporizable component sheet layer 510 comprises at least two vaporizing subsections 523 configured with less conductive material that an at least three dividing subsections 520. In this aspect, vaporizable component sheet layer 510 includes a three vaporizing subsections 523a-523c, wherein vaporizing subsections 523a-523c have variable reduction of volume of conductible material in comparison to each of the at least three dividing subsections 520. Further, vaporizing subsections 523a-523c may have variable geometries consequent of the variable reduction of volume, or to otherwise control or optimize the vaporization of vaporizing subsections 523a-523c. For example, as illustrated in FIG. 5, vaporizing subsection 523a may include a width B, vaporizing subsection 523b may include a cross-sectional area C, and vaporizing subsection 523c may include a cross-sectional area D, wherein cross-sectional area A may be less than cross-sectional area B and cross-sectional area B may be less than cross-sectional area C. However, all three of vaporizing subsections 523a, 523b, and 523c must include corresponding cross-sectional areas less than a cross-sectional area A of surrounding dividing subsections 520, wherein cross-sectional area A is the smallest cross-sectional area of a dividing subsection 520. Varying the geometry of vaporizable subsections 523a-523c may allow for the optimization or further control of forces generated in the vaporization of the vaporizable subsections during the VFAW process.

Figure 6:
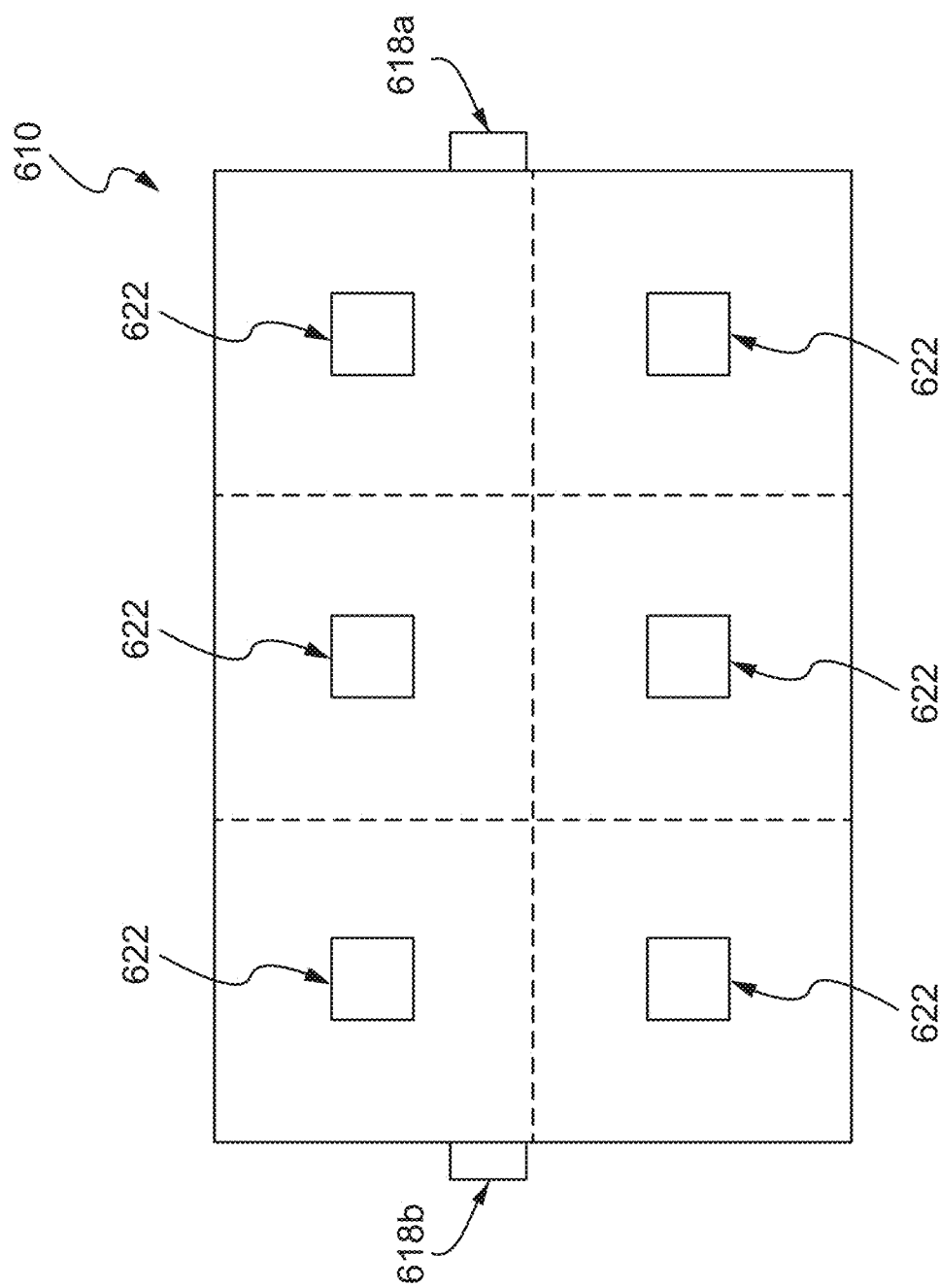
FIG. 6 illustrates a top view of an example vaporizable component sheet layer, in accordance with aspects of the present disclosure.

FIG. 6 illustrates a top view of an additional variation of vaporizable component sheet layer 610, in accordance with an aspect of the present disclosure, wherein vaporizable component sheet layer includes an non-linear configuration of a plurality of vaporizing subsections 622. In the example illustrated in FIG. 6, the reduced quantity of conductive material of vaporizing subsections 622 is achieved via reducing the height of vaporizable subsections 622, comparable to the reduced height of vaporizing subsections 622 as illustrated in FIG. 4. However, FIG. 6 differs from FIG. 4 insofar as the plurality of vaporizing subsections 622 need not necessarily be arranged in one continuous line. Such a non-linear arrangement of vaporizing subsections 622 may be advantageous in a variety of industrial applications, such as automobile fabrication and assembly, wherein the plurality of welds completed using the VFAW process needs to be arranged to specifically complete a non-linear automobile component part.

Figure 7:
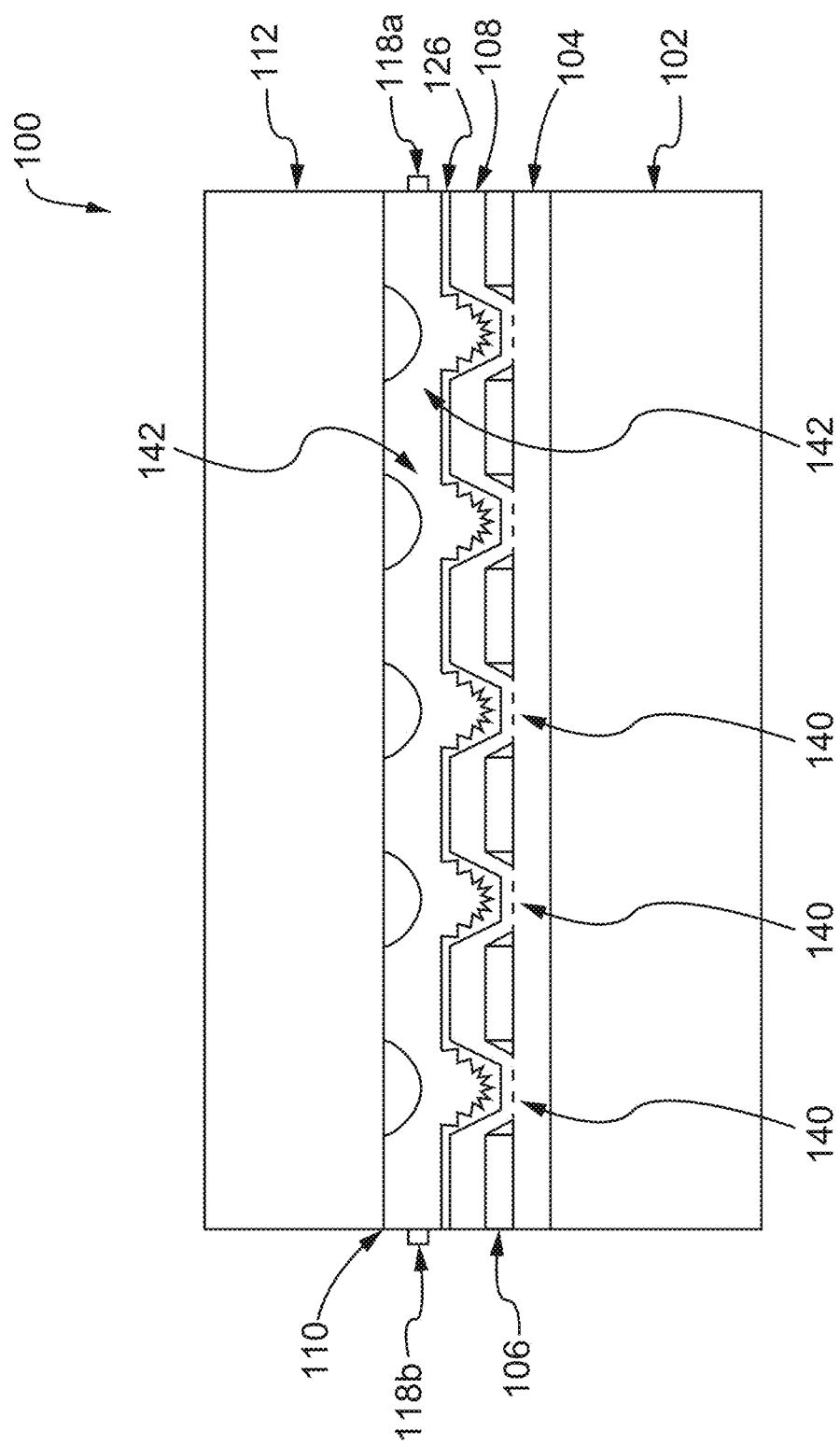
FIG. 7 illustrates side cross-sectional representative view of a vaporizing foil actuator welding device during vaporization of a vaporizable component sheet layer, in accordance with aspects of the present disclosure.

FIG. 7 illustrates a representative side cross-sectional view of a VFAW welding setup, such as VFAW welding setup 100 of FIG. 1, during the vaporization of vaporizable component sheet layer 110, according to aspects of the present disclosure. As shown in FIG. 1, VFAW welding setup 100 includes first stabilizing component 102, target sheet layer 104 secured relative to first stabilizing component 102, a plurality of standoff components 106 sandwichably positioned between target layer 104 and flier sheet layer 108 forming a standoff spacing distance. Further, VFAW welding setup 100 as illustrated in FIG. 7 also includes first electrically insulating layer 126 positioned relative to vaporizable component sheet layer 110. In addition, second stabilizing component 112 may be located proximally relative to vaporizable component sheet layer 110 and may also be electrically insulated relative to vaporizable component sheet layer 110. Second stabilizing component 112 may, similarly to FIG. 1, be selectively securable to first stabilizing component layer 110, such that forces produced by the vaporization of vaporizable component sheet layer 110 may be contained by the cooperation of both first stabilizing component 102 and second stabilizing component 112.

FIG. 7 further representatively illustrates the vaporization of the vaporizing subsections of vaporizable component sheet layer 110 portion of the VFAW process, including a plurality of vaporized subsections 142 mid-vaporization corresponding with the formation of a plurality of weld interfaces 140, wherein the location of each of the vaporizing subsections 142 corresponds to the location of a corresponding welded interface 140. Weld interfaces 140 may produce a wavelike pattern at joining point of the two metals, characteristic of a weld made via the VFAW process. Further the plurality of welds formed at welded interface 140 may occur contemporaneously. Although five weld interfaces 140 corresponding with five vaporized subsections 142 are depicted in FIG. 7, the present disclosure is not limited to five weld interfaces 140 corresponding with five vaporized subsections 142. For example, the system may be scaled to include any suitable number of weld interfaces 140 and corresponding vaporized subsections 142, as the VFAW process in accordance with the present disclosure does not require a substantial increase in current or voltage needed to complete an increasing plurality of welds. Consequently, the simultaneity or contemporaneousness of the plurality of welds formed in combination with their non-additive voltage requirements may result in a VFAW welding setup 100 that is easily implementable in a manufacturing setting, for example.

Figure 8:
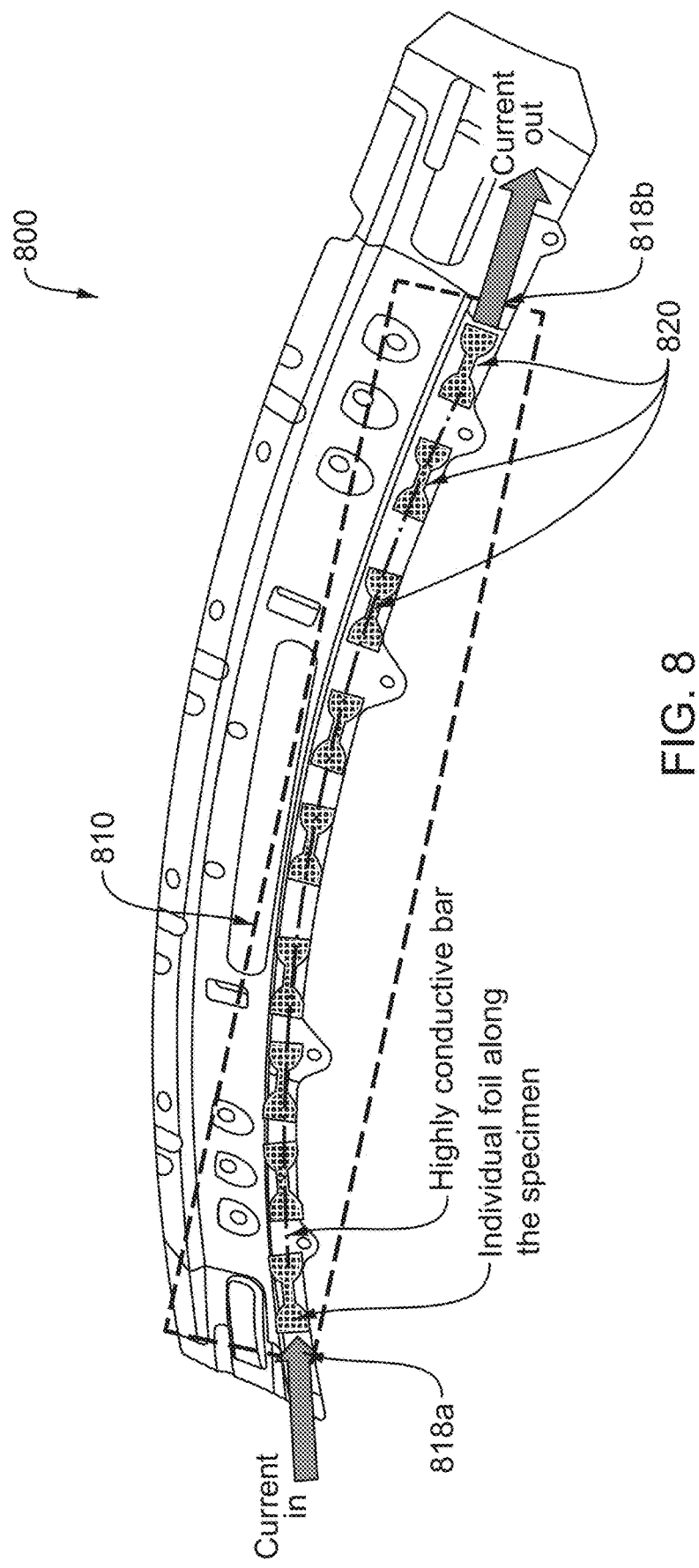
FIG. 8 illustrates a perspective view of an example vaporizable component sheet layer applied to an automobile roof arch, in accordance with aspects of the present disclosure.

FIG. 8, according to aspects of the present disclosure, illustrates a automobile roof arch 800, wherein automobile roof arch 800 may include a vaporizable component sheet layer 810 such that vaporizable component sheet layer 810 includes a plurality of vaporizable subsections 820. Further, FIG. 8 illustrates an example voltage receiver 818*a* and circuit completer 818*b*, also included in vaporizable component sheet layer 810. Automobile roof arch 800 may provide a practical application of the VFAW method in an automobile manufacturing industry setting.

Figure 9:
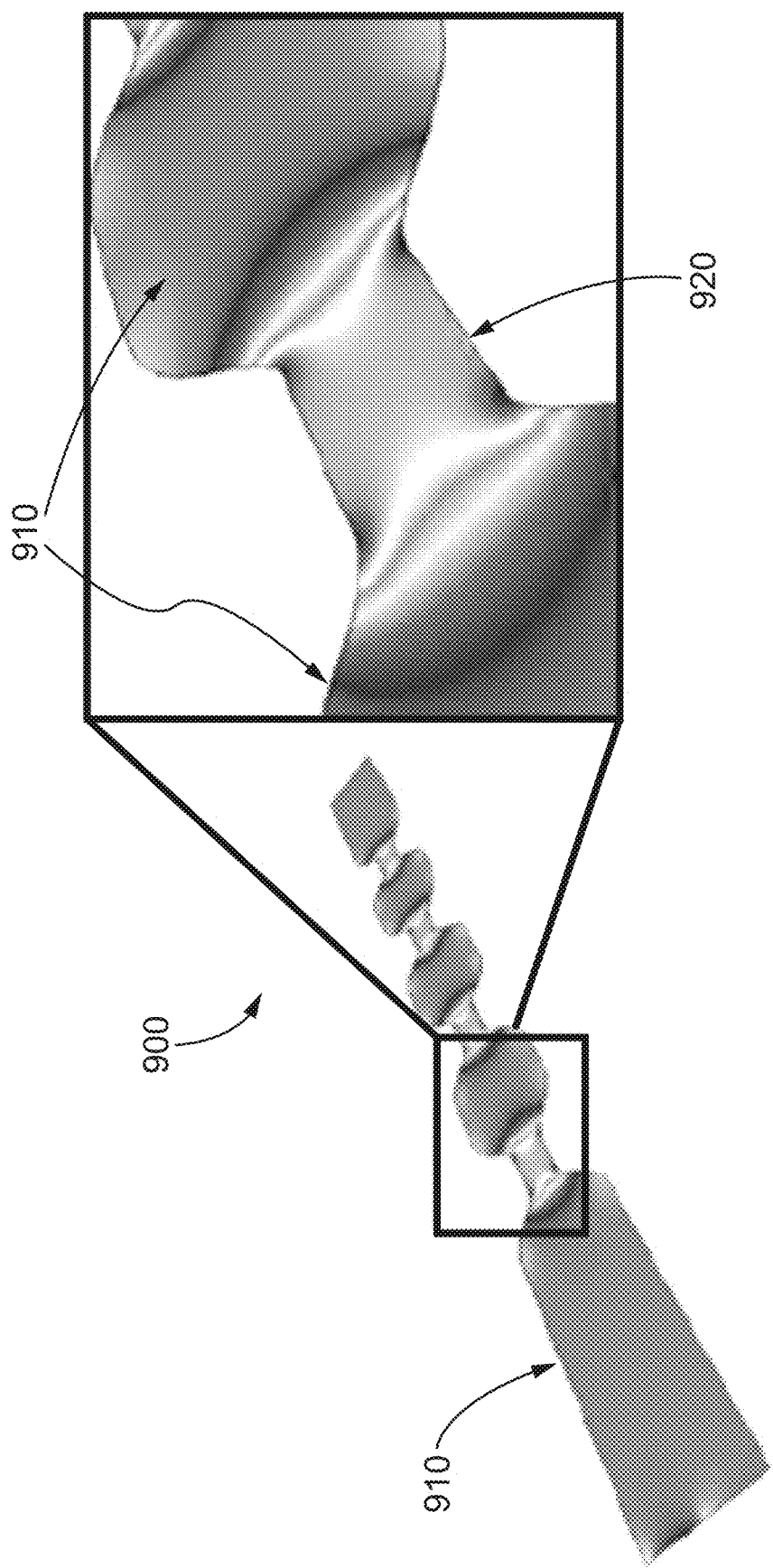
FIG. 9 illustrates a perspective view an example vaporizable component sheet layer, in accordance with aspects of the present disclosure.

According to aspects of the present disclosure, FIG. 9 illustrates a VFAW welding simulation 900, wherein VFAW welding simulation 900 includes a vaporizable component sheet layer 910 in the vaporization process of the VFAW welding method. VFAW welding simulation 900 demonstrates that the amount of energy needed to complete multiple contemporaneous VFAW welds is approximately the same as the amount of energy required to complete a single VFAW weld. Consequently, VFAW welding simulation 900 demonstrates the preferability of the VFAW method for completing multiple contemporaneous VFAW welds, in comparison to traditional energetically additive welding methods currently implemented in the automotive industry, such as Resistive Spot Welding.

Figure 10:
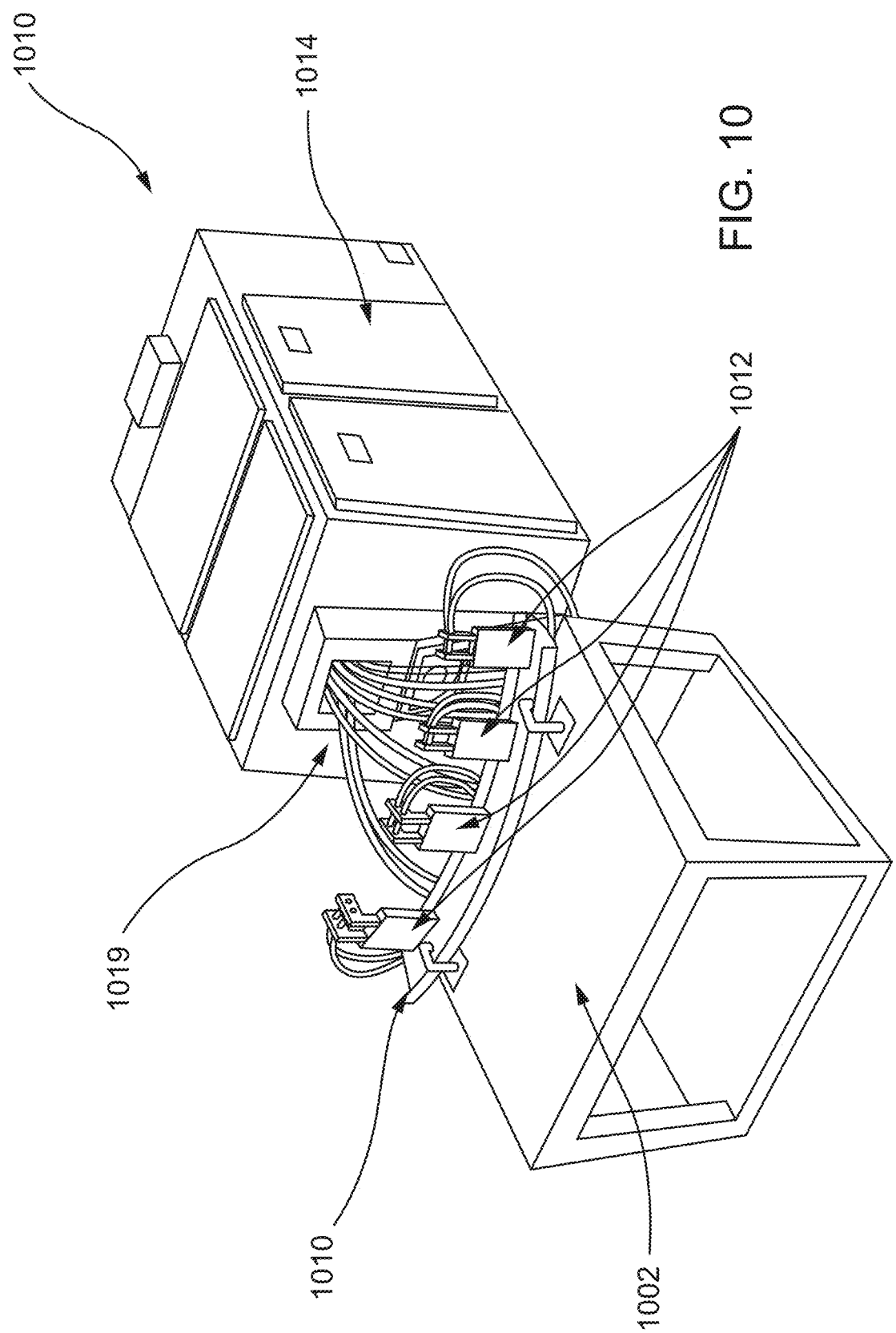
FIG. 10 illustrates an overview of an example vaporizing foil actuator welding system applied to an automobile roof arch, in accordance with aspects of the present disclosure.

As illustrated in FIG. 10, according to various aspects of the present disclosure, VFAW weld setup 1000 may comprise a first stabilizing component 1002, a plurality of second stabilizing components 1012, a vaporizable component sheet layer 1010, a voltage source 1014, and a voltage connector 1019. VFAW weld setup 1000 illustrates an additional variation of a possible VFAW weld setup applicable in the automotive industry, comparable though not the same as VFAW weld set ups illustrated in FIGS. 12-14.

Figure 11:
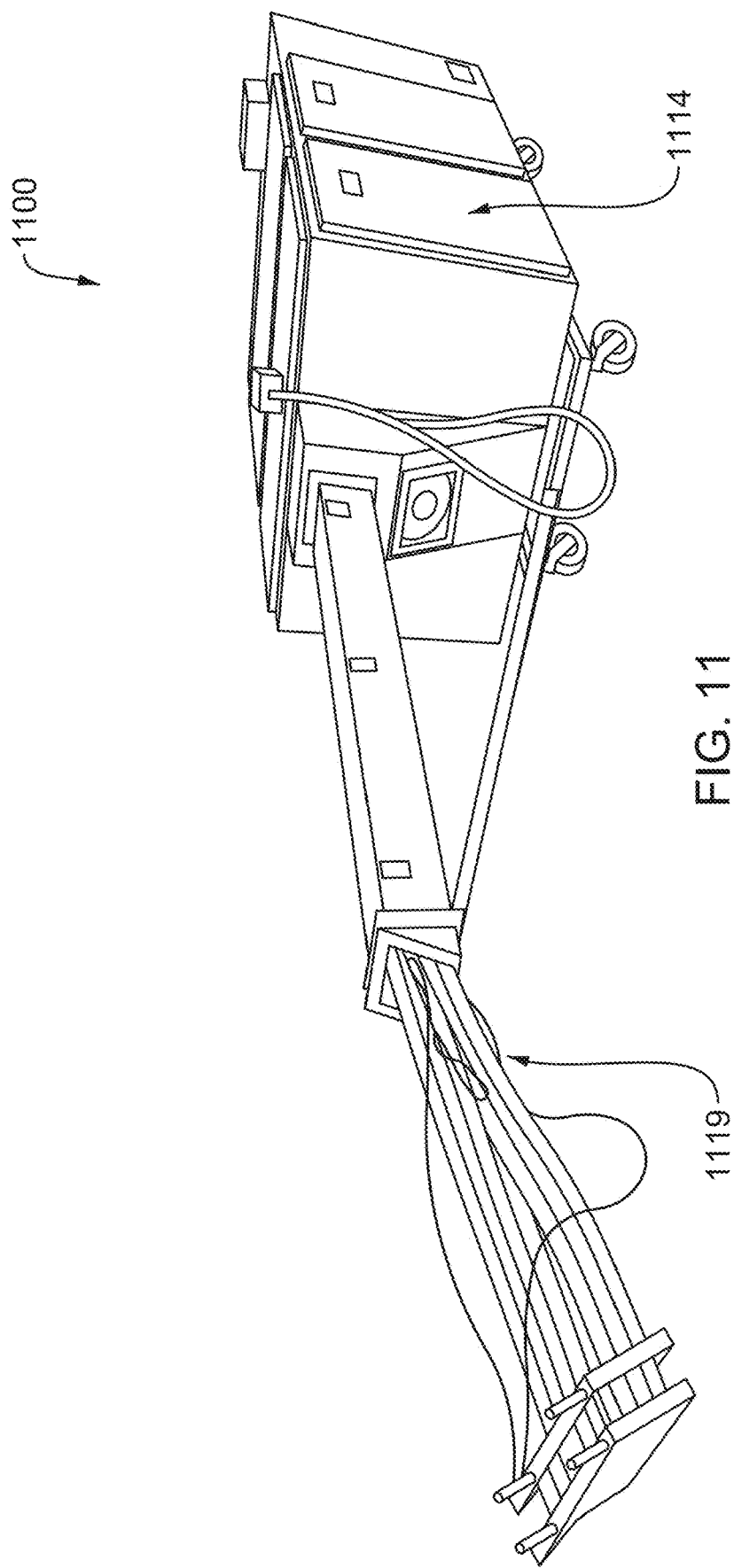
FIG. 11 illustrates a perspective view of an example voltage source, in accordance with aspects of the present disclosure.

FIG. 11, according to aspects of the present disclosure, illustrates an example voltage source 1100, wherein voltage source 1110 may comprise a capacitor bank 1114 and a voltage connector 1119. Capacitor bank 1114 may be capable of completing up to and including eight contemporaneous, VFAW welds. However, though capacitor bank 1114 may be capable of completing more than one contemporaneous VFAW welds (e.g., 4, 8, etc.) in one vaporizable component sheet layer 110 (as shown in FIG. 1).

Figure 12:
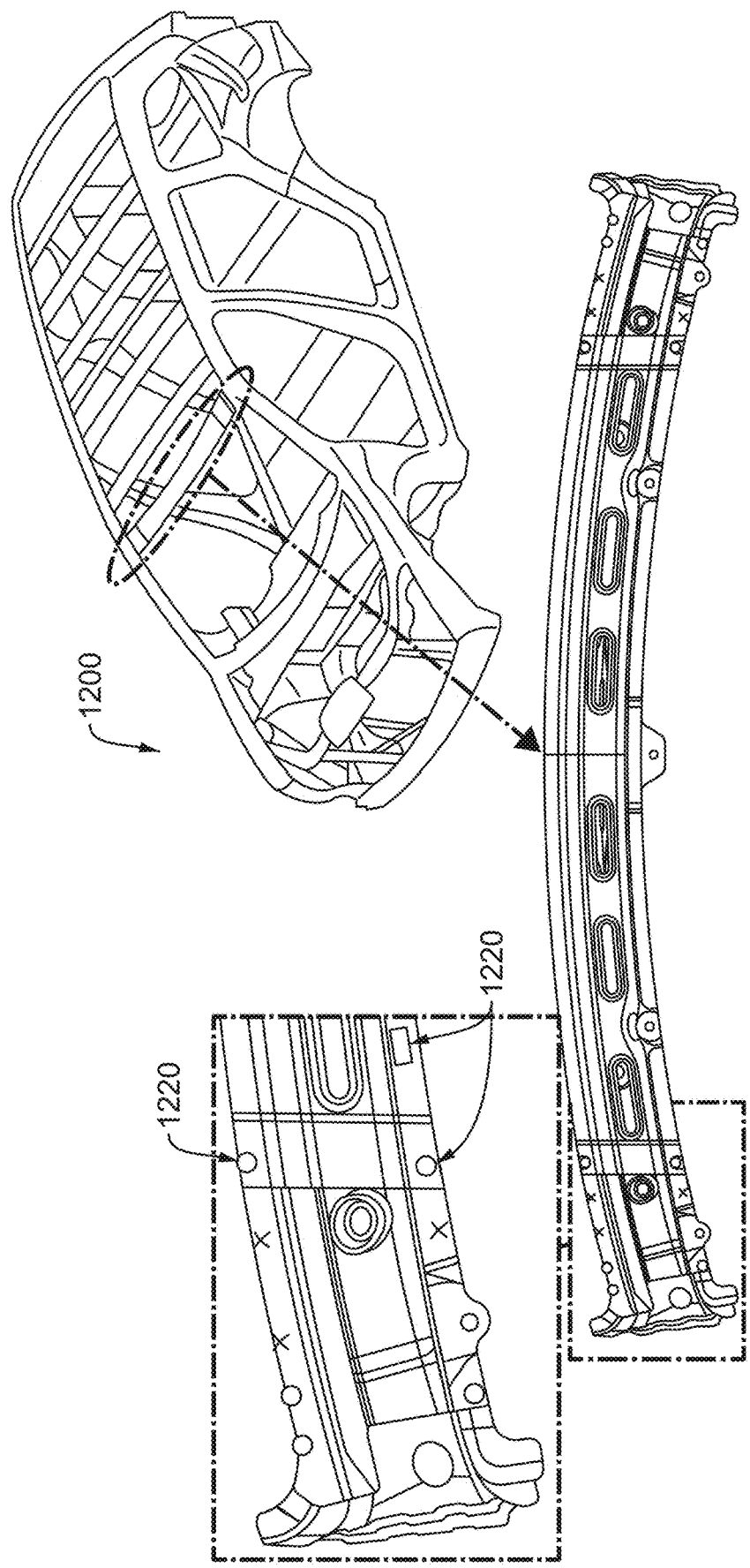
FIG. 12 illustrates a top view of an example vaporizable component sheet layer, in accordance with aspects of the present disclosure.

According to aspects of the present disclosure, FIG. 12 illustrates a VFAW application 1200, wherein VFAW application 1200 may provide an example implementation of the VFAW process in the production of an automobile roof arch, for example.

Figure 13:
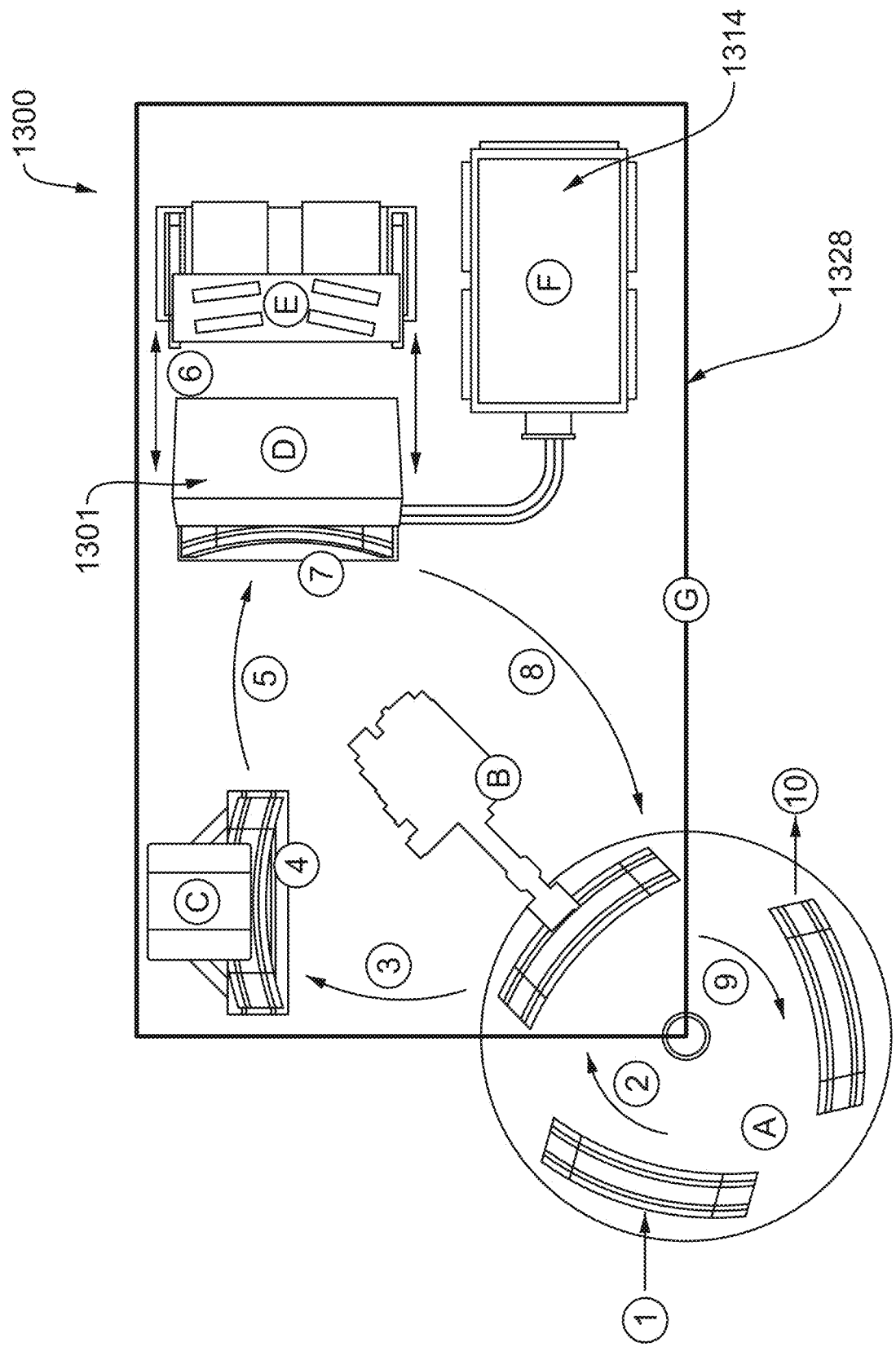
FIG. 13 illustrates a perspective view an example application of a vaporizing foil actuator multiple spot welding method, in accordance with aspects of the present disclosure.

As illustrated in FIG. 13, according to various aspects of the present disclosure, is a top view of an example VFAW setup 1300 applicable in the automotive industry, specifically regarding automotive manufacturing assembly methods and machinery. VFAW setup 1300 may comprise a VFAW welding device 1301 comparable to VFAW welding set up 100, as illustrated in FIG. 1, such that VFAW welding device 1301 may be selectively connectable to a voltage source 1314. Further, VFAW welding set up may include a housing 1328, wherein housing 1328 encloses VFAW welding device 1301 and voltage source 1314, so as to protect any automotive assembly employees, or similar individuals.

Figure 14:
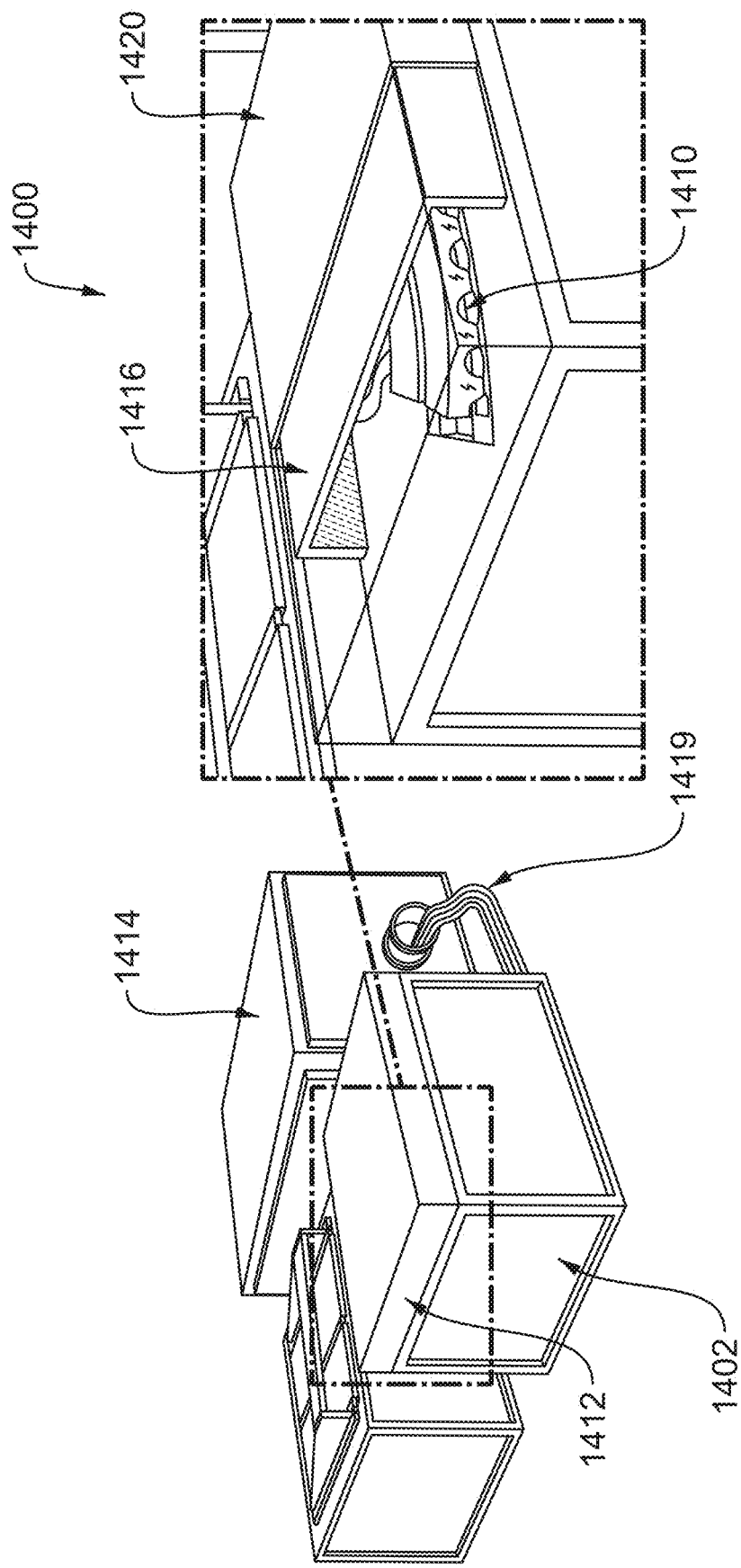
FIG. 14 illustrates a top view of an example vaporizing foil actuator welding system, in accordance with aspects of the present disclosure.

FIG. 14, according to various aspects of the present disclosure, illustrates an example VFAW set up 1400 applicable in the automotive industry. VFAW set up 1400 may comprise a sound attenuating enclosure 1416, a voltage source 1414, a voltage connector 1419, a first stabilizing component 1402, a second stabilizing component 1412, and a vaporizable component sheet layer 1410, wherein vaporizable component sheet layer 1410 further comprises a plurality of vaporizing subsections 1420 that correspond to the location of the plurality of welds upon completion of the VFAW process. Sound attenuating enclosure 1416 may encapsulate vaporizable component sheet layer 1416, and be encapsulated by first stabilizing component 1402 and second stabilizing component 1412 upon securing first stabilizing component 1402 with second stabilizing component 1412. Further voltage source 1414, illustrated as a capacitor bank, may be selectively connectable via voltage connector 1414, wherein voltage connector 1414 may connect to vaporizable component sheet layer 1410 even when first stabilizing component 1402 is actively secured to second stabilizing component 1412.

As illustrated in FIG. 15, the VFAW welding method 1500 may include securing a target sheet layer to a first stabilizing component, wherein the first stabilizing component may aid the focus of the force generated by the collision in the VFAW process. Method 1500 may further include positioning a plurality of standoff components sandwichably between the target layer and a flier sheet layer. An electrically insulating layer may be sandwichably positioned between the flier sheet layer and a vaporizable component sheet layer. Method 1500 may further include positioning an electrically insulated second stabilizing component relative to the vaporizable component sheet layer and securing the second stabilizing component to the first stabilizing component, such that the first stabilizing component and the second stabilizing component may interoperate to counteract forces generated during the production of the plurality of welds. Method 1500 may also include connecting the vaporizable component sheet layer with a source of voltage selectively communicable with the vaporizable component sheet layer, and discharging a current from the source of voltage to the vaporizable component sheet layer, such that the conductive vaporizable component sheet layer may be loaded with an excess of electrons. Upon the vaporizable subsections reaching a loaded electron limit, method then may result in the vaporization of the vaporizable subsections of vaporizable component sheet layer. Specifically, the vaporizable subsections of the vaporizable component sheet layer may be rapidly heated to a temperature above their sublimation point prior to the same occurring for the vaporizing subsections. Consequently, the vaporizable subsections are electrically vaporized. The sublimation of the solid material vaporizable subsections into a gas phase results in the rapid expansion of the molecular components of the vaporizable subsections then in a gas phase. Because the expansion of the gas phase vaporizable subsections are contained by first stabilizing component and second stabilizing component, such that the gas is forced to expand into flier sheet layer such that flier sheet layer is accelerated into a collision with target sheet layer with a force comparable to a traditional method of impact or collision welding that relies of the use of explosives. Thus, method may then include joining flier sheet layer with target sheet layer at the at least two vaporizing subsections of vaporizable component sheet layer by a high force, wherein the high force is generated during the sublimation of the minimized subsections of vaporizable component sheet layer a multiple at the at least two vaporizing subsections contemporaneously.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A multiple spot vaporization weld system, comprising:
   a first stabilizing component;
   a target sheet layer secured relative to the first stabilizing component;
   a flier sheet layer;
   a plurality of standoff components arranged sandwichably between the target layer and the flier sheet layer;
   a first electrically insulating layer sandwichably located between the flier layer and a vaporizable component sheet layer, wherein the vaporizable component sheet layer includes:
      at least two vaporizing subsections vaporizable so as to produce a plurality of welds;
      at least three dividing subsections configured to separate the vaporizing subsections;
      wherein a first volume of conductive material is reduced in each of the at least two vaporizing subsections as compared to a second volume of conductive material in each of the at least three dividing subsections;
   a source of voltage selectively connectable with the vaporizable component sheet layer; and
   a second stabilizing component electrically insulated relative to the vaporizable component sheet layer interoperable with the first stabilizing component to counteract force applied to the first stabilizing component during production of the plurality of welds.

2. The multiple spot vaporization weld system of claim 1, further comprising: an encapsulating housing.

3. The multiple spot vaporization weld system of claim 1, further comprising a sound attenuating component.

4. The multiple spot vaporization weld system of claim 1, wherein the source of voltage includes a capacitor bank.

5. The multiple spot vaporization weld system of claim 1, wherein the vaporizable component sheet layer comprises a conductible material.

6. The multiple spot vaporization weld system of claim 1, wherein the vaporizable component sheet layer comprises aluminum.

7. The multiple spot vaporization weld system of claim 1, wherein each of the at least two vaporizing subsections of the vaporizable component sheet layer has at least three dividing subsections connected in alternating series therewith.

8. The multiple spot vaporization weld system of claim 1, wherein a geometry or volume of the at least two vaporizing subsections is varied to optimize the forces produced during vaporization.

9. The multiple spot vaporization weld system of claim 1, wherein at least one vaporizing subsection has a geometry or volume different than at least one other vaporizing subsection.

10. The multiple spot vaporization weld system of claim 1, wherein the second stabilizing component comprises a non-conductive material.

11. The multiple spot vaporization weld system of claim 1, wherein the second stabilizing component has a non-conductive surface coating.

12. The multiple spot vaporization weld system of claim 1, wherein the second stabilizing component is electrically insulated relative to the vaporizable component sheet layer via a second electrically insulating layer sandwichably located between the second stabilizing component and the vaporizable component sheet layer.

13. The multiple spot vaporization weld system of claim 1, wherein the plurality of standoff components extend from the target sheet layer.

14. A method for welding multiple spots, the method including:
   securing a target sheet layer relative to a first stabilizing component;
   locating a plurality of standoff components between a flier sheet layer and the target sheet layer;

positioning an electrically insulating material layer on the flier sheet layer;

securing a vaporizable component sheet layer between the electrically insulating material layer and an electrically insulated second stabilizing component, the vaporizable component sheet layer including at least two vaporizing subsections and at least three subsections interspersed with the at least two vaporizing subsections, wherein a first volume of conductive material is reduced in each of the at least two vaporizing subsections as compared to a second volume of conductive material in each of the at least three dividing subsections;

securing the second stabilizing component relative to the first stabilizing component;

completing a circuit between the vaporizable component sheet layer and a source of voltage and the vaporizable component sheet layer; and communicating a current from the source of voltage with the vaporizable component sheet layer via at least two of the at least three interspersed subsections of the vaporizable component sheet layer to produce sublimation of each of the at least two vaporizing subsections, wherein the sublimation contained between the first stabilizing component and the second stabilizing component produces a high force that joins the flier sheet and the target sheet to one another.

15. The method of welding multiple spots of claim 14, further comprising:

providing an encapsulating housing.

16. The method of welding multiple spots of claim 14, wherein the current is selectively discharged from the source of voltage to the vaporizable component sheet layer such that the flier sheet layer is joined with the target sheet layer at the at least two vaporizing subsections of the vaporizable component sheet layer non-contemporaneously.

17. The method of welding multiple spots of claim 14, wherein the current discharged from source of voltage to the vaporizable component sheet layer is optimized based on the minimization of a volume or alteration of a geometry of the vaporizing subsections of the vaporizable component sheet layer.

18. The method of welding multiple spots of claim 14, wherein the second stabilizing component comprises a non-conductive material.

19. The method of welding multiple spots of claim 14, wherein the second stabilizing component has a non-conductive surface coating.

20. The method of welding multiple spots of claim 14, wherein the second stabilizing component is electrically insulated relative to the vaporizable component sheet layer via a second electrically insulating layer sandwichably located between the second stabilizing component and the vaporizable component sheet layer.

* * * * *